United States Patent Office 3,775,433
Patented Nov. 27, 1973

3,775,433
ANTIMICROBIAL METABOLITE S491β AND S491ν
AND CHEMICAL DERIVATIVES
George Alfred Ellestad, Pearl River, N.Y., and William James McGahren, Demarest, N.J., assignors to American Cyanamid Company, Stamford, Conn.
No Drawing. Filed May 4, 1972, Ser. No. 250,201
Int. Cl. C07c 5/32
U.S. Cl. 260—343.3  6 Claims

ABSTRACT OF THE DISCLOSURE

This disclosure describes two new compounds, designated S491β and S491ν, produced in a microbiological fermentation under controlled aerobic conditions using a strain of *Aspergillus chevalieri*. The compound S491β has antimicrobial activity whereas the compound S491ν has antiviral activity. This disclosure also describes certain derivatives of S491β and S491ν which possess antimicrobial activity.

BRIEF SUMMARY OF THE INVENTION

This invention relates to two new compounds, designated S491β and S491ν, which may be represented by the following structural formulae:

(S491β)    (S491ν)

The invention includes within its scope methods of preparing the above new compounds as well as certain derivatives thereof obtained by chemical conversion. All of the derivatives and S491β possess antimicrobial activity whereas S491ν possesses antiviral activity.

DETAILED DESCRIPTION OF THE INVENTION

The new compounds, which we have designated S491β and S491ν, are formed during the cultivation under controlled aerobic conditions of a strain of *Aspergillus chevalieri*. This organism, which is a member of the group *Aspergillus glaucus*, was isolated from a soil sample collected near Redding, Calif. The description and identification of this microorganism, maintained in the culture collection of the Lederle Laboratories Division, American Cyanamid Company, Pearl River, N.Y., was supplied by Dr. H. D. Tresner of these laboratories. A viable culture of the organism has been deposited with the Culture Collection Laboratory, Northern Utilization Research and Development Division, U.S. Dept. of Agriculture, Peoria, Ill. and has been added to its permanent collection. It is freely available to the public in this depository under its accession number NRRL 5463.

Description of the organism

In conducting the taxonomic study, the methods used were those described by K. B. Raper and D. I. Fennell in "The Genus Aspergillus" (1965). The Williams and Wilkins Company, Baltimore, Md. Identification was made by their keys and descriptions. The following are the characteristics observed:

Colonies on Czapek's solution agar growing restrictedly, 2 to 3 cm. in two weeks at 25° C. Colonies yellowish, characterized by the abundant cleistothecia. Central areas becoming bluish-gray from development of conidial heads. Heads mostly 100–200μ in diameter; conidiophores having a globose vesicular apex 20–45μ in diameter; sterigmata in a single series; conidia ovate to elliptical with one end commonly flattened, spinulose, mostly 3.5–4.5μ. Cleistothecia enmeshed in orange-red encrusted hyphae, mostly 100–200μ in diameter, globose, bright yellowish color. Ascospores lenticular 5.1–5.7μ by 2.8–3.4μ, walls faintly roughened, prominent equatorial crests. Colony reverse in maroon shades with maroon pigments diffusing into the agar.

Colonies on malt-extract agar growing restrictedly 1.5–2.5 cm. in 14 days. Colony surface characterized by heavy accumulation of cleistothecia, conidial production very thin. Reverse in yellowish-brown shades.

Colonies on potato-dextrose agar growing restrictedly, 1.5–2.0 cm. in 14 days. Colony surface characterized by dark greenish to bluish-grap accumulation of conidia. Cleistothecia development most abundantly in peripheral zones. Reverse in maroon shades with maroon pigment diffusing into medium.

A more complete description of this species may be found in the aforementioned Raper and Fennell reference.

The fermentation process

Cultivation of the organism *Aspergillus chevalieri* NRRL 5463 may be carried out in a wide variety of liquid culture media. Media which are useful for the production of these novel compounds include assimilable sources of carbon such as starch, sugar, molasses, glyceral, etc.; assimilable sources of nitrogen such as protein, protein hydrolysate, polypeptides, amino acids, corn steep liquor, etc. and inorganic anions and cations such as potassium, sodium, calcium, sulfate, phosphate, chloride, etc. Trace elements such as boron, molybdenum, copper, etc.; are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1% octadecanol in lard oil, may be added as needed.

Inoculum preparation

Shaker flask of *Aspergillus chevalieri* NRRL 5463 is prepared by inoculating 100 milliliters of sterile Stage 1 liquid medium in 500 ml. flasks with scrapings and washings of spores from an agar slant of the culture. The following medium is ordinarily used for Stage 1 and Stage 2 inoculum.

Stage 1 medium: Gm.
  Corn steep liquor _____ 5
  Glucose _____ 20
  Soy flour _____ 10
  Calcium carbonate _____ 3
  Water, q.s. to 1 liter.

Stage 2 medium: Gm.
  Corn steep liquor _____ 30
  Glucose _____ 30
  Cotton seed flour _____ 10
  Calcium carbonate _____ 5
  Water, q.s. to 1 liter.
  Adjust pH with NaOH to pH 6.5 before sterilization.

The flasks are incubated at a temperature of 22° C.–25° C., preferably 23° C., and agitated vigorously on a rotary shaker for 48–72 hours. These 100 ml. inocula are used to inoculate 1 liter and 12 liter batches of Stage 2 inoculum medium in 2 liter and 20 liter glass fermentors. The inoculum mash is aerated with sterile air while growth is continued for 48–72 hours. These batches of inocula are used to inoculate tank fermentors.

Tank fermentation

For the production of S491β and S491ν in tank fermentors, the following fermentation medium is preferably used:

|  | Gm. |
|---|---|
| Corn steep liquor | 10 |
| Glucose | 50 |
| Ammonium tartrate | 2 |
| $MgSO_4 \cdot 7H_2O$ | 0.5 |
| $KH_2PO_4$ | 1 |
| KCl | 0.5 |
| $FeSO_4 \cdot 7H_2O$ | 0.01 |

Water, q.s. to 1 liter.
Adjust pH with NaOH to 6.5 before sterilization.

Each tank is inoculated with 3 to 10% of inoculum made as described above. Aeration is supplied at the rate of 0.5–1.0 liter of sterile air per liter of broth per minute and the fermenting mixture is agitated by an impeller driven at 200–400 r.p.m. The temperature is maintained at 20°25° C., usually at 23° C. The fermentation is ordinarily continued for 160–190 hours, at which time the mash is harvested.

Isolation of S491β and S491ν

After the fermentation is completed, the mash containing S491β and S491ν is adjusted to about pH 5 and extracted with a water immiscible polar solvent such as ethyl acetate using about 500 ml. of solvent per liter of mash for each extraction. The extracts are pooled and concentrated under reduced pressure to an oil like residue. This residue is defatted by partitioning between methanol and heptane. Concentration of the methanol layer yields a dark, solid residue. Chromatography on this residue over acid washed silica gel by elution with methylene chloride yields S491β and S491ν on concentration of the eluate to a gum and trituration with ether. Fractional crystallization from benzene/hexane provides a means of separating the two components in column fractions containing both.

Isolation of S491ν

As an alternative and more productive method, S491ν may be obtained by the sodium borohydride reduction of S491β. To a solution of 1 gm. of S491β in 50 ml. of methanol is added dropwise a solution of 330 mg. of sodium borohydride in 5 ml. of water. The solution is stirred for one hour. The methanol is concentrated in vacuo and the residue is taken up in water and acidified with 6 N HCl. The white precipitate which forms is taken up in ether, washed with brine, dried and concentrated to a crystalline residue. Recrystallization from ethyl acetate/hexane gives S491ν as white crystals.

Antimicrobial characteristics

S491β and S491ν exhibit in vitro antiprotozoal activity in a broth dilution test with a culture of *Tetrahymena pyriformis* as shown in Table I below.

TABLE I

| Compound: | Concentration (mcg./ml.), 50% inhibition |
|---|---|
| S491β | 7 |
| S491ν | 4 |

S491ν possesses antiviral activity *in vitro* inhibiting a deoxyribonucleic acid containing virus, *Herpes simplex*. A plaque inhibition test is utilized to detect antiviral activity in *Herpes simplex* infected rabbit kidney cell monolayers. A 50 microgram portion of S491ν contained in ¼-inch filter paper discs was placed on the surface of semi-solid agar nutrient covering the infected cells. At the end of 3 to 4 days, following an incubation at 37° C. in an atmosphere of 5% $CO_2$ in air, a zone of protection of the rabbit kidney cells was observed. A comparison was made against 5-iododeoxyuridine at a concentration of 25 mcg./disc. The results appear in Table II.

TABLE II

| Compound | Concentration (mcg./disc) | Diameter of zone with >50% inhibition of virus plaque formation |
|---|---|---|
| S491ν | 50 | 1 inch. |
|  | 50 | ⅞ inch. |
| 5-iododeoxyuridine | 25 | 2 inches. |
|  | 25 | Do. |

Representative in vitro antimicrobial activities of S491β and of certain derivatives of S491β and S491ν are presented in Table III below. These results are expressed as the minimal inhibitory concentration (MIC) of the compounds in mcg./ml. required to inhibit the growth of representative microorganisms in a nutrient medium.

TABLE III

| Organism | Compound (MIC mcg./ml.) | | | | | | |
|---|---|---|---|---|---|---|---|
|  | (a) | (b) | (c) | (d) | (e) | (f) | (g) |
| *Microsporum canis* ATCC 10214 | 250 |  | 250 | 250 |  |  |  |
| *Microsporum gypseum* ATCC 14683 | 250 |  | 250 | 250 |  |  | 250 |
| *Trychophyton tonsurans* E10 | 250 |  | 250 | 250 |  |  | 250 |
| *Trychophyton mentagrophytes* E11 | 250 |  | 250 | 250 |  |  |  |
| *Trychophyton rubrum* E97 | 250 |  | 250 | 250 |  |  |  |
| *Mycobacterium smegmatis* 607 | 10 | 10 | 10 | 250 | 62 | 62 |  |
| *Staphylococcus aureus* ATCC 14154 | 10 | 250 | 25 | 250 | 62 | 62 |  |
| *Streptococcus pyogenes* C203 | 5 | 100 | 25 | 62 | 62 | 62 |  |
| *Proteus vulgaris* ATCC 8427 | 100 |  | 100 |  |  |  |  |
| *Salmonella gallinarum* 605 | 250 |  |  |  |  |  |  |

NOTE.—(a) S491β; (b) S491β cyclopropyl methyl ester; (c) S491β acetate (1); (d) S491ν methyl ester; (e) S491β diacetate (1); (f) S491β diacetate (2); (g) S491β acetate (2).

The invention will be described in greater detail in conjunction with the following specific examples.

EXAMPLE 1

Inoculum preparation

Shaker flask inoculum of *Aspergillus chevalieri* NRRL 5463 was prepared by inoculating two 100 ml. portions of serile Stage 1 liquid medium in 500 ml. flasks with scrapings or washings of spores from an agar slant of the culture. The following media were used for Stage 1 and Stage 2.

Stage 1 medium:

|  | Gm. |
|---|---|
| Corn steep liquor | 5 |
| Glucose | 20 |
| Soy flour | 10 |
| Calcium carbonate | 3 |

Water to 1 liter.

Stage 2 medium:

|  |  |
|---|---|
| Corn steep liquor | 30 |
| Glucose | 30 |
| Cottonseed flour | 10 |
| Calcium carbonate | 5 |

Water to 1 liter.
Adjust to pH 6.5 with NaOH before sterilization.

The flasks were incubated at a temperature of 23° C. and agitated vigorously on a rotary shaker for 72 hours. These 100 ml. inocula were used to inoculate 12 liters of sterile Stage 2 inoculum medium in a 5 gallon glass fermentor. The inoculum mash was aerated with sterile air while growth was continued for 48 hours.

EXAMPLE 2

Fermentation

A fermentation medium was prepared according to the following formula:

|  | Gm. |
|---|---|
| Corn steep liquor | 10 |
| Glucose | 50 |
| Ammonium tartrate | 2 |
| $MgSO_4 \cdot 7H_2O$ | 0.5 |
| $KH_2PO_4$ | 1 |
| KCl | 0.5 |
| $FeSO_4 \cdot 7H_2O$ | 0.01 |

Water to 1 liter.

This medium was adjusted to pH 6.5 with NaOH and then sterilized. A 400 liter tank fermentor containing 300 liters of the above medium was inoculated with 12 liters of Stage 2 inoculum. Hodag LG-8® oil was used as a defoaming agent. Aeration was supplied at the rate of 0.5 liter of sterile air per liter of broth per minute and the fermenting mixture was agitated by an impeller driven at 250 r.p.m. The temperature was maintained at 23° C. The fermentation was carried out for 186 hours at which time the mash was harvested.

EXAMPLE 3

Isolation of S491β and S491ν

A 675 liter portion of whole mash from a 1000 liter fermentation, prepared essentially as described in Example 2 but on a larger scale, was extracted with 335 liters of ethyl acetate at pH 5.1. The extract was concentrated to an oily sludge and then defatted by partitioning between methanol and heptane. Concentration of the methanol layer gave a dark solid residue. Chromatography over acid washed silica gel by elution with methylene chloride gave S491β on concentration of the eluate to a gum and trituration with ether. Recrystallization from benzene/hexane gave 54 gm. of pure S491β. A small amount of S491ν (1.5 gm.) was eluted right behind the S491β. Fractional crystallization from benzene/hexane provided a means of separation in those column fractions where the two compounds existed together. Since S491ν may also be obtained from S491β by sodium borohydride reduction its physical constants are given in Example 4. The physical constants of S491β are as follows:

S491β: M.P. 180°–185° C.; $[\alpha]_D^{25}$ +112.4° C. (c. 0.38, $CH_3OH$); IR 3500, 1755, 1710, 1620, 1400 and 1370 cm.$^{-1}$;

$\lambda_{max.}^{CH_3OH}$ 241 nm. ($\epsilon$ 5850); $\lambda_{max.}^{CH_3OH}$ 1 drop 0.1 N NaOH 263 nm. ($\epsilon$ 4600).

EXAMPLE 4

Sodium borohydride reduction of S491β to S491ν

To a solution of 1.0 gm. of S491β in 50 ml. of methanol was added dropwise a solution of 330 mg. of sodium borohydride in 5 ml. of water. Immediate effervescence occurred and the solution was stirred at room temperature for one hour. The methanol was concentrated in vacuo and the residue taken up in water and acidified with 6 N hydrochloric acid. A white precipitate formed which was taken up in ether, washed with brine, dried over magnesium sulfate and concentrated to a crystalline residue. Recrystallization from ethyl acetate/hexane gave 400 mg. of S491ν as white crystals. A second crop gave an additional 163 mg. The physical constants of S491ν are as follows:

S491ν M.P. 190°–195° C.; $[\alpha]_D^{25}$ +69.3° C. (c. 0.44, $CH_3OH$); IR 1745 cm.$^{-1}$.

This material was identical in every respect with that obtained from the fermentation.

EXAMPLE 5

Acetylation of S491β to S491β actate(1)

A solution of 100 mg. of S491β in 0.25 ml. of pyridine and 0.25 ml. of acetic anhydride was allowed to stand at room temperature for 4 hours. The reaction mixture was concentrated to dryness in vacuo to give a crystalline residue. Recrystallization from benzene/hexane gave 22 mg. of S491β acetate(1). The physical constants and structural formula of S491β acetate(1) are as follows:

S491β acetate(1): M.P. 169°–171° C.; $[\alpha]_D^{25}$ +102.9° C. (c. 0.44, $CH_3OH$); IR 1785, 1725, 1635 cm.$^{-1}$; $\lambda_{max}$ 235 nm. ($\epsilon$ 6440).

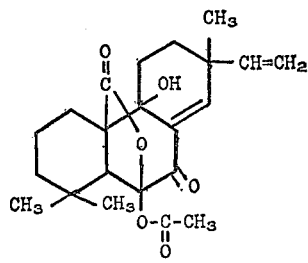

EXAMPLE 6

Conversion of S491β to S491β acetate(2), S491β diacetate(1), and S491β diacetate(2)

A solution of 30 ml. of acetic anhydride containing 4.0 gm. of S491β was treated with 160 mg. of p-toluenesulfonic acid. Slight warming was required to achieve solution. After standing overnight at room temperature, the solution was poured into ice water and extracted with ether. The ether extract was washed with brine, dried and concentrated to dryness. Attempts to dissolve the gummy residue in the lower phase of a methanol/heptane system caused 272 mg. of S491β acetate(2) to crystallize out. The mother liquors were chromatographed on a 400 gm. Celite® partition column and developed with the upper phase of the solvent system. The column was monitored with a Beckman DU ultraviolet spectrophotometer set at 260 nm. Three bands were eluted. Concentration of the A band gave 606 mg. of semicrystalline residue. Recrystallization from benzene/hexane gave 147 mg. of S491β acetate(2). Another 18 mg. was obtained from the mother liquors. The physical constants and structural formula of S491β acetate(2) are as follows:

S491β acetate(2): M.P. 161°–165° C.; $[\alpha]_D^{25}$ +247.5° C. (c. 0.50, $CH_3OH$); IR 1780, 1700, 1615 cm.$^{-1}$; $\lambda_{max}$ 226 and 260 nm. ($\epsilon$ 2780 and 3890).

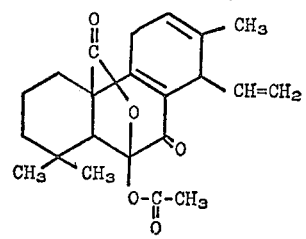

Concentration of the B band gave 289 mg. of a gum which crystallized on standing. Recrystallization from benzene/hexane gave 198 mg. of S491β diacetate(1). The physical constants and structural formula of S491β diacetate(1) are as follows:

S491β diacetate(1): M.P. 149°–151° C.; $[\alpha]_D^{25}$ +14.9° C. (c. 0.34, $CH_3OH$); IR 1780 broad, 1725, 1700, 1615 cm.$^{-1}$; $\lambda_{max}$ 265 nm. ($\epsilon$ 9770).

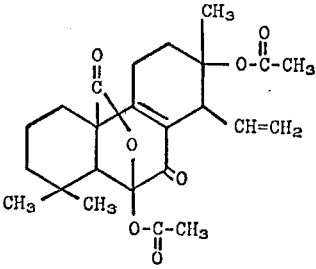

Concentration of the C band gave 336 mg. of crystalline residue. Recrystallization from benzene/hexane gave 228 mg. of S491β diacetate(2). The physical constants and structural formula of S491β diacetate(2) are as follows:

S491β diacetate(2): M.P. 162°–165° C.; $[\alpha]_D^{25}$ +22.3° C. (c. 0.34, $CH_3OH$); IR 1785, 1740, 1710, 1620 cm.$^{-1}$; $\lambda_{max.}$ 265 nm. ($\epsilon$ 4560).

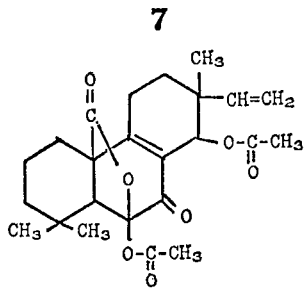

EXAMPLE 7

Conversion of S491β to S491β cyclopropyl methyl ester

To an ethereal solution of 465 mg. of S491β was added an excess of ethereal diazomethane at 15° C. The ether was allowed to evaporate slowly, whereupon crystals were deposited. The semicrystalline residue was taken up in ether, washed with sodium bicarbonate, brine and dried. Evaporation gave a yellow gum. Crystallization from ether/hexane gave 150 mg. of S491β cyclopropyl methyl ester as white crystals. The physical constants and structural formula of S491β cyclopropyl methyl ester are as follows:

S491β cyclopropyl methyl ester: M.P. 197°–200° C.; $[\alpha]_D^{25}$ +18.9° C. (c. 0.46, $CH_3OH$); IR 1730, 1701, 1645 cm.$^{-1}$.

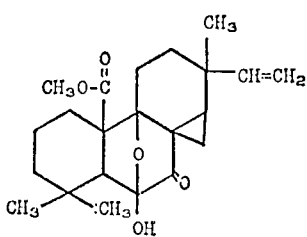

EXAMPLE 8

Conversion of S491ν to S491ν methyl ester

A solution of 1.0 gm. of S491ν in ether was treated with an excess of ethereal diazomethane at 15° C. Evaporation of the ether solution gave a solid residue which crystallized from benzene/hexane to give 564 mg. of S491ν methyl ester. The physical constants and structural formula of S491ν methyl ester are as follows:

S491ν methyl ester: M.P. 119°–121° C.; $[\alpha]_D^{25}$+31.0° C. (c. 0.32, $CH_3OH$); IR 1725 cm.$^{-1}$.

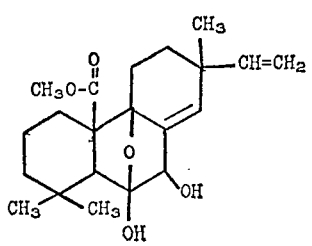

We claim:

1. The compound S491β represented by the formula:

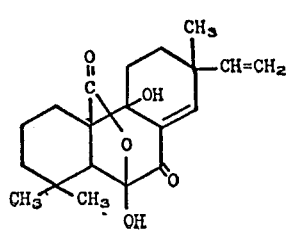

2. The compound S491ν represented by the formula:

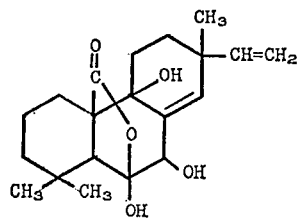

3. The compound S491β acetate(1) represented by the formula:

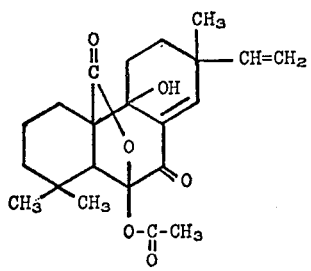

4. The compound S491β acetate(2) represented by the formula:

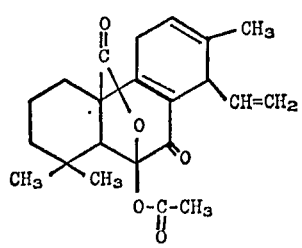

5. The compound S491β diacetate(1) represented by the formula:

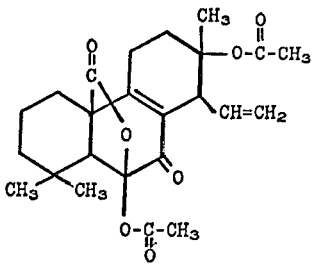

6. The compound S491β diacetate(2) represented by the formula:

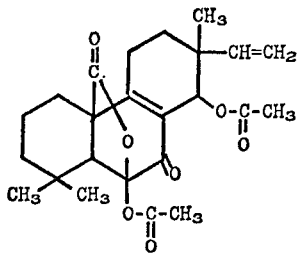

References Cited

UNITED STATES PATENTS 2,785,184  3/1957  Sanderson _____ 260—343.3

ALEX MAZEL, Primary Examiner

A. M. T. TIGHE, Assistant Examiner

U.S. Cl. X.R.

260—346.2; 195—80; 424—279